US010685075B2

United States Patent
Blanco et al.

(10) Patent No.: US 10,685,075 B2
(45) Date of Patent: Jun. 16, 2020

(54) SYSTEM AND METHOD FOR TAILORING AN ELECTRONIC DIGITAL ASSISTANT QUERY AS A FUNCTION OF CAPTURED MULTI-PARTY VOICE DIALOG AND AN ELECTRONICALLY STORED MULTI-PARTY VOICE-INTERACTION TEMPLATE

(71) Applicant: MOTOROLA SOLUTIONS, INC, Chicago, IL (US)

(72) Inventors: Alejandro G. Blanco, Fort Lauderdale (FI); Hao Zeng, Long Grove, IL (US); Eric Johnson, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 210 days.

(21) Appl. No.: 15/950,317

(22) Filed: Apr. 11, 2018

(65) Prior Publication Data

US 2019/0318035 A1  Oct. 17, 2019

(51) Int. Cl.
*G06F 16/248* (2019.01)
*G10L 15/22* (2006.01)
(Continued)

(52) U.S. Cl.
CPC ........ *G06F 16/9535* (2019.01); *G06F 16/248* (2019.01); *G10L 15/22* (2013.01); *G10L 17/005* (2013.01)

(58) Field of Classification Search
CPC .................................................. G06F 16/9535
(Continued)

(56) References Cited

U.S. PATENT DOCUMENTS 8,121,653 B2   2/2012 Marti et al.
2007/0071206 A1* 3/2007 Gainsboro et al. .........
                                        H04M 3/2281
                                        704/E17.003
(Continued)

FOREIGN PATENT DOCUMENTS

WO   2012135226 A1   10/2012

OTHER PUBLICATIONS

Kazuhiro Otsuka et al.: "A probabilistic inference of multiparty-conversation structure based on Markov-switching models of gaze patterns head directions, and utterances", Multimodal Interfaces, ACM, 2 Penn Plaza Suite 701 New York NY 10121-0701 USA, Oct. 4, 2005, pp. 191-198.

(Continued)

*Primary Examiner* — Muluemebet Gurmu
(74) *Attorney, Agent, or Firm* — Daniel R. Bestor

(57) ABSTRACT

An input audio signal is monitored at an electronic digital assistant of an electronic computing device. The assistant determines that the audio signal includes audio from multiple speaking parties, identifies first and second parties of the multiple parties and roles of the parties, accesses a database of multi-party interaction templates and selects, as a function of the roles of the parties, a particular multi-party interaction template that matches the roles, and then generates, based on a detected content of the audio signal and the particular multi-party interaction template, a database query to retrieve information responsive to or supplemental to content of the audio signal. The assistant then causes the query to be performed results of the query provided to the first party, the second party, a dispatcher or administrator associated with the parties, or a computer-aided-dispatch system associated with the parties.

18 Claims, 4 Drawing Sheets

(51) Int. Cl.
*G10L 17/00* (2013.01)
*G06F 16/9535* (2019.01)

(58) Field of Classification Search
USPC .......................................................... 707/722
See application file for complete search history.

(56) References Cited

U.S. PATENT DOCUMENTS

2008/0172359 A1    7/2008  Lundell et al.
2015/0149182 A1    5/2015  Kalns et al.
2016/0217807 A1    7/2016  Gainsboro et al.
2016/0379643 A1*  12/2016  Ito et al. ............. G10L 15/1822

OTHER PUBLICATIONS

The International Search Report and the Written Opinion, corresponding to serial No. PCT/US2019/025272 filed Apr. 2, 2019, dated Jun. 26, 2019, all pages.

\* cited by examiner

SYSTEM AND METHOD FOR TAILORING AN ELECTRONIC DIGITAL ASSISTANT QUERY AS A FUNCTION OF CAPTURED MULTI-PARTY VOICE DIALOG AND AN ELECTRONICALLY STORED MULTI-PARTY VOICE-INTERACTION TEMPLATE

BACKGROUND OF THE INVENTION

Tablets, laptops, phones (e.g., cellular or satellite), mobile (vehicular) or portable (personal) two-way radios, and other mobile computing devices are now in common use by users, such as first responders (including firemen, police officers, and paramedics, among others), and provide such users and others with instant access to increasingly valuable additional information and resources such as vehicle histories, arrest records, outstanding warrants, health information, real-time traffic or other situational status information, and any other information that may aid the user in making a more informed determination of an action to take or how to resolve a situation, among other possibilities.

Many such mobile computing devices further comprise, or provide access to, electronic digital assistants (or sometimes referenced as "virtual partners") that can provide the user thereof with valuable information in an automated (e.g., without further user input) or semi-automated (e.g., with some further user input) fashion. The valuable information provided to the user can be based on explicit requests for such information posed by the user via an input (e.g., such as a parsed natural language input or an electronic touch interface manipulation associated with an explicit request) in which the electronic digital assistant may reactively provide such requested valuable information, or can be based on some other set of one or more context or triggers in which the electronic digital assistant may proactively provide such valuable information to the user absent any explicit request from the user.

As some existing examples, electronic digital assistants such as Siri provided by Apple, Inc.® and Google Now provided by Google, Inc.®, are software applications running on underlying electronic hardware that are capable of understanding natural language, and may complete electronic tasks in response to user voice inputs, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, warning users of nearby dangers such as traffic accidents or environmental hazards, and providing many other types of information in a reactive or proactive manner.

However, conventional electronic digital assistants are generally capable of monitoring and responding to only a single voice query and/or requestor at a time. Thus, there exists a need for an improved technical method, device, and system for an electronic digital assistant to computationally process multiple party voice dialog in order to respond to, and aid in, increasingly complex situations and dialog.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
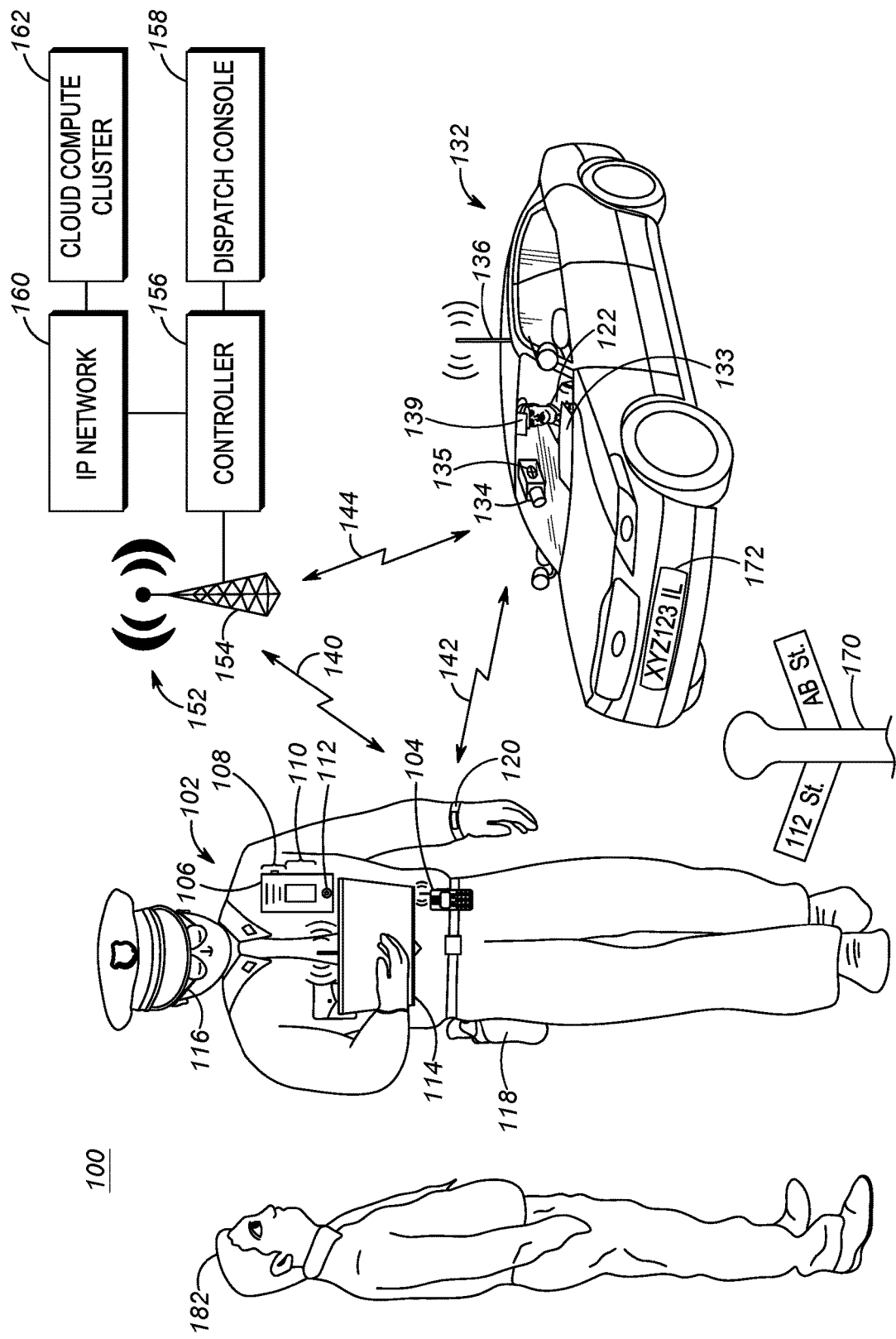
FIG. 1 is a system diagram illustrating a system for operating an electronic digital assistant, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved technical method, device, and system for an electronic digital assistant to computationally process captured multi-party voice dialog and generate a query and provide a response to, or supplemental information for, the captured multi-party voice dialog as a function of an electronically stored multi-party voice-interaction template.

In one embodiment, a process for tailoring an electronic digital assistant generated query as a function of a captured multi-party voice dialog and an electronically stored multi-party voice-interaction template includes: monitoring, at an electronic processing device, an input audio signal; determining, by the electronic processing device, that the input audio signal includes audio from multiple speaking parties; identifying, by the electronic processing device, a first party of the multiple parties and identifying a role associated with the first party; identifying, by the electronic processing device, a second party of the multiple parties and identifying a role associated with the second party; accessing, by the electronic processing device, a database of a plurality of multi-party interaction templates and selecting, as a function of the identified roles of the first party and the second party, a particular multi-party interaction template from the plurality of multi-party interaction templates that matches the identified roles of the first party and the second party; generating, by the electronic processing device based on a detected content of the input audio signal and the selected particular multi-party interaction template, a database query to retrieve information responsive to or supplemental to the detected content of the input audio signal; and causing, by the electronic processing device, the database query to be performed and causing, by the electronic processing device, results of the query to be provided to one or more of the first party, the second party, a dispatcher or administrator associated with the first or second parties, and a computer-aided-dispatch (CAD) system associated with the first or second parties.

In a further embodiment, an electronic processing device for tailoring an electronic digital assistant generated query as a function of a captured multi-party voice dialog and an electronically stored multi-party voice-interaction template includes: a memory; a transceiver; and one or more processors configured to: monitor an input audio signal; determine that the input audio signal includes audio from multiple speaking parties; identify a first party of the multiple parties and identifying a role associated with the first party; identify a second party of the multiple parties and identifying a role associated with the second party; access, via a local electronic storage or via the transceiver, a database of a plurality of multi-party interaction templates and select, as a function of the identified roles of the first party and the second party, a particular multi-party interaction template from the plurality of multi-party interaction templates that matches the identified roles of the first party and the second party; generate, based on a detected content of the input audio signal and the selected particular multi-party interaction template, a database query to retrieve information responsive to or supplemental to the detected content of the input audio signal; and cause the database query to be performed and cause, via the transceiver, results of the query to be provided to one or more of the first party, the second party, a dispatcher or administrator associated with the first or second parties, and a computer-aided-dispatch (CAD) system associated with the first or second parties.

Each of the above-mentioned embodiments will be discussed in more detail below, starting with example communication system and device architectures of the system in which the embodiments may be practiced, followed by an illustration of processing steps for achieving the improved technical method, device, and system for an electronic digital assistant. Further advantages and features consistent with this disclosure will be set forth in the following detailed description, with reference to the figures.

1. Communication System and Device Structures
a. Communication System Structure

Figure 2:
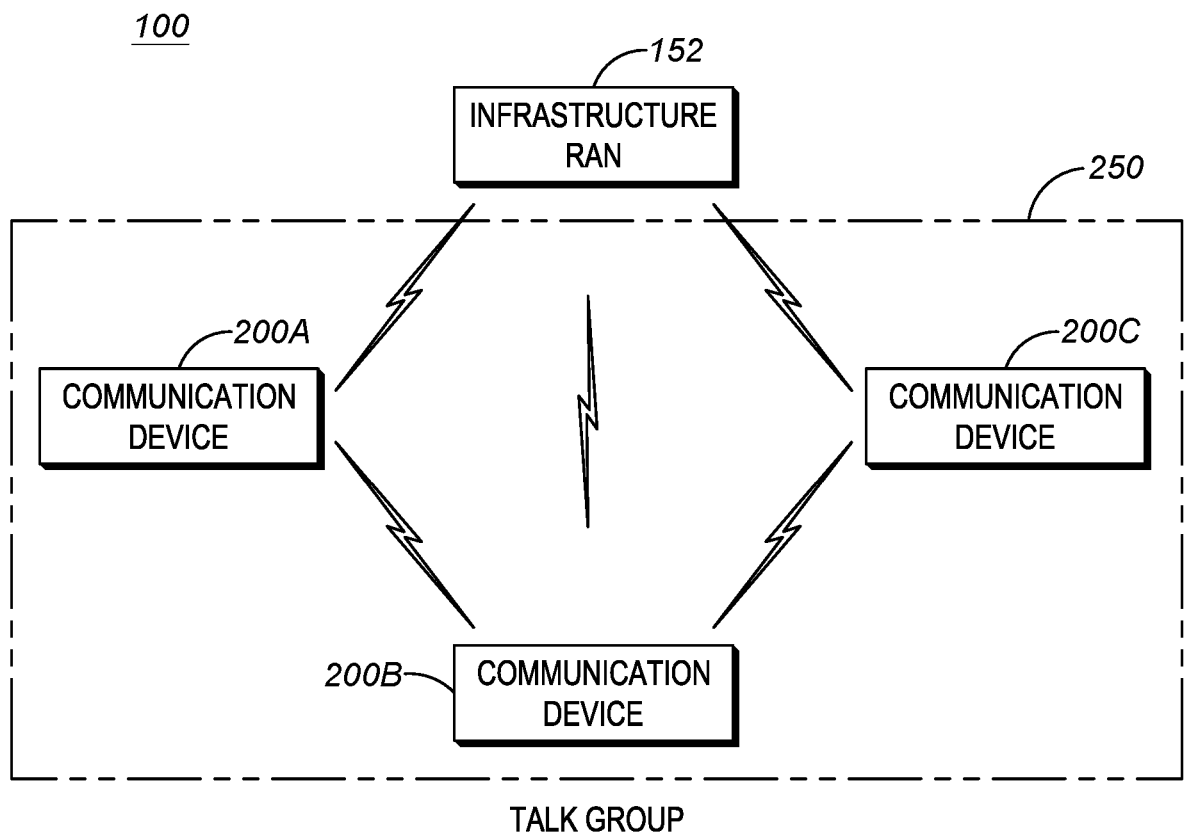
FIG. 2 is a system diagram illustrating a plurality of communication devices of FIG. 1 that are associated with a talk group and that may be located at varying locations, in accordance with some embodiments.

Referring now to the drawings, and in particular FIG. 1, a communication system diagram illustrates a system 100 of devices including a first set of devices that a user 102 (illustrated in FIG. 1 as a first responder police officer) may wear, such as a primary battery-powered portable radio 104 used for narrowband and/or broadband direct-mode or infrastructure communications, a battery-powered radio speaker microphone (RSM) video capture device 106, a laptop 114 having an integrated video camera and used for data applications such as incident support applications, smart glasses 116 (e.g., which may be virtual reality, augmented reality, or mixed reality glasses, may include a video camera, and/or may include a head-tracking and/or eye-tracking function), sensor-enabled holster 118, and/or biometric sensor wristband 120. Although FIG. 1 illustrates only a single user 102 with a respective first set of devices, in other embodiments, the single user 102 may include additional sets of same or similar devices, and additional users (such as user 182) may be present with respective additional sets of same or similar devices as user 102, as illustrated in FIG. 2. User 182 may be geographically proximate to (or not geographically proximate to) user 182. Audio of users 102 and/or 182 may be captured by devices owned, worn, or associated with user 102 or user 182 as a function of proximity and device ownership.

System 100 may also include a vehicle 132 associated with the user 102 (e.g., the user 102 illustrated as potentially alternatively sitting in a driver's seat position 122 of vehicle 132 in FIG. 1 instead of standing outside of it), or associated with a user 122 entirely different and separate from user 102 (and user 182) but including a same one or more devices and accessories (not illustrated in FIG. 1) as user 102, having an integrated vehicular computing device 133, an associated vehicular video camera 134 and/or microphone 135, a coupled vehicular transceiver 136, and a head and/or eye-tracking device 139. Although FIG. 1 illustrates only a single vehicle 132 with a respective single vehicular computing device 133, single vehicular video camera 134 and single transceiver 136, in other embodiments, the vehicle 132 may include additional same or similar computing devices, video cameras and/or transceivers, and additional vehicles may be present with respective additional sets of computing devices, video cameras, and/or transceivers.

Each of the portable radio 104, RSM video capture device 106, laptop 114, and vehicular computing device 133 may be capable of directly wirelessly communicating via direct-mode wireless link(s) 142, and/or may be capable of wirelessly communicating via a wireless infrastructure radio access network (RAN) 152 over respective wireless link(s) 140, 144 and via corresponding transceiver circuits.

Many of the devices shown in FIG. 1 (such as the portable radio 104, the RSM video capture device 106, the laptop 114, the mobile communication device 133, the infrastructure controller 156, dispatch console 158, and one or more computing devices in the cloud computing cluster 162) may be referred to as communication devices (for example, communication devices 200A, 200B, 200C shown in FIG. 2). Although FIG. 1 shows multiple communication devices associated with the user 102, in some embodiments, the communication system 100 includes communication devices of multiple users.

For example, as shown in FIG. 2, multiple communication devices 200A-200C may form a talk group 250 and may be dispersed across a wide geographic area 251. The communication device 200A may be associated with a first user located at a first location, the communication device 200B may be associated with a second user located at a second location, and the communication device 200C may be associated with a third user located at a third location. The first, second, and third locations may be geographically the same or different from one another.

Further, as shown in FIG. 2, the communication devices 200A, 200B, and 200C are members of the same talk group, i.e., talk group 250. Although not shown in FIG. 2, each of the communication devices 200A, 200B, 200C may also be associated with one or more talk groups other than the talk group 250.

In some embodiments, the communication devices 200A-200C communicate with each other over the infrastructure RAN 152 and/or communicate with each other directly as described herein. Similarly, other devices, such as the dispatch console 158, may communicate with communication devices 200A-200C of multiple users through the infrastructure RAN 152. In some embodiments, one or more users may have multiple associated communication devices, for example, as shown in FIG. 1.

Referring back to FIG. 1, the portable radio 104, in particular, may be any mobile computing device used for infrastructure RAN or direct-mode media (e.g., voice, audio, video, etc.) communication via a long-range wireless transmitter and/or transceiver that has a transmitter transmit range on the order of miles, e.g., 0.5-50 miles, or 3-20 miles (e.g., in comparison to a short-range transmitter such as a Bluetooth, Zigbee, or NFC transmitter) with other mobile computing devices and/or the infrastructure RAN 152. The long-range transmitter may implement a direct-mode, conventional, or trunked land mobile radio (LMR) standard or protocol such as ETSI Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long range transmitter may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, the long range transmitter may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

In the example of FIG. 1, the portable radio 104 may form the hub of communication connectivity for the user 102, through which other accessory devices such as a biometric sensor (for example, the biometric sensor wristband 120), an activity tracker, a weapon status sensor (for example, the sensor-enabled holster 118), a heads-up-display (for example, the smart glasses 116), the RSM video capture device 106, and/or the laptop 114 may communicatively couple.

In order to communicate with and exchange video, audio, and other media and communications with the RSM video capture device 106, laptop 114, and/or smart glasses 116, the portable radio 104 may contain one or more physical electronic ports (such as a USB port, an Ethernet port, an audio jack, etc.) for direct electronic coupling with the RSM video capture device 106, laptop 114, and/or smart glasses 116 and/or may contain a short-range transmitter (e.g., in comparison to the long-range transmitter such as a LMR or Broadband transmitter) and/or transceiver for wirelessly coupling with the RSM video capture device 106, laptop 114, and/or smart glasses 116. The short-range transmitter may be a Bluetooth, Zigbee, or NFC transmitter having a transmit range on the order of 0.01-100 meters, or 0.1-10 meters.

In other embodiments, the RSM video capture device 106, the laptop 114, and/or the smart glasses 116 may contain their own long-range transceivers and may communicate with one another and/or with the infrastructure RAN 152 or vehicular transceiver 136 directly without passing through portable radio 104.

The RSM video capture device 106, in particular, provides voice functionality features similar to a traditional RSM, including one or more of acting as a remote microphone that is closer to the user's 102 mouth, providing a remote speaker allowing play back of audio closer to the user's 102 ear, and including a PTT switch or other type of PTT input. The voice and/or audio recorded at the remote microphone may be provided to the portable radio 104 for storage and/or analysis or for further transmission to other mobile communication devices or the infrastructure RAN 152, or may be directly transmitted by the RSM video capture device 106 to other mobile computing devices or to the infrastructure RAN 152. The voice and/or audio played back at the remote speaker may be received from the portable radio 104 or received directly from one or more other mobile computing devices or the infrastructure RAN 152. The RSM video capture device 106 may include a separate physical PTT switch 108 that functions, in cooperation with the portable radio 104 or on its own, to maintain the portable radio 104 and/or RSM video capture device 106 in a monitor only mode, and which switches the device(s) to a transmit-only mode (for half-duplex devices) or transmit and receive mode (for full-duplex devices) upon depression or activation of the PTT switch 108. The portable radio 104 and/or RSM video capture device 106 may form part of a group communications architecture that allows a single mobile computing device to communicate with one or more group members (not shown) associated with a particular group of devices at a same time.

Additional features may be provided at the RSM video capture device 106 as well. For example, a display screen 110 may be provided for displaying images, video, and/or text to the user 102 or to someone else. The display screen 110 may be, for example, a liquid crystal display (LCD) screen or an organic light emitting display (OLED) display screen. In some embodiments, a touch sensitive input interface may be incorporated into the display screen 110 as well, allowing the user 102 to interact with content provided on the display screen 110. A soft PTT input may also be provided, for example, via such a touch interface.

A video camera 112 may be further provided at the RSM video capture device 106, integrating an ability to capture images and/or video and store the captured image data (for further analysis) or transmit the captured image data as an image or video stream to the portable radio 104 and/or to other mobile computing devices or to the infrastructure RAN 152 directly. The video camera 112 and RSM remote microphone may be used, for example, for capturing audio and/or video of a field-of-view associated with the user 102, storing the captured audio and/or video data for further analysis or transmitting the captured audio and/or video data as an audio and/or video stream to the portable radio 104 and/or to other mobile computing devices or to the infrastructure RAN 152 directly for further analysis. The RSM remote microphone may be an omni-directional or unidirectional microphone or array of omni-directional or unidirectional microphones that may be capable of identifying a direction from which a captured sound emanated.

In some embodiments, the RSM video capture device 106 may be replaced with a more limited body worn camera that may include the video camera 112 and/or microphone noted above for capturing audio and/or video, but may forego one or more of the features noted above that transform the body worn camera into a more full featured RSM, such as the separate physical PTT switch 108 and the display screen 110, and remote microphone functionality for voice communications in cooperation with portable radio 104.

The laptop 114, in particular, may be any wireless computing device used for infrastructure RAN or direct-mode media communication via a long-range or short-range wireless transmitter with other mobile computing devices and/or the infrastructure RAN 152. The laptop 114 includes a display screen for displaying a user interface to an operating system and one or more applications running on the operating system, such as a broadband PTT communications application, a web browser application, a vehicle history database application, a workflow application, a forms or reporting tool application, an arrest record database application, an outstanding warrant database application, a mapping and/or navigation application, a health information database application, or other types of applications that may require user interaction to operate. The laptop 114 display screen may be, for example, an LCD screen or an OLED display screen. In some embodiments, a touch sensitive input interface may be incorporated into the display screen as well, allowing the user 102 to interact with content provided on the display screen. A soft PTT input may also be provided, for example, via such a touch interface.

Front and/or rear-facing video cameras may be further provided at the laptop 114, integrating an ability to capture video and/or audio of the user 102 and/or a field of view substantially matching the user's 102, and store and/or otherwise process the captured video and/or audio for further analysis or transmit the captured video and/or audio as a video and/or audio stream to the portable radio 104, other mobile computing devices, and/or the infrastructure RAN 152 for further analysis.

The smart glasses 116 may include a digital imaging device, a computing device, a short-range and/or long-range transceiver device, and/or a projecting device. The smart glasses 116 may maintain a bi-directional communications connection with the portable radio 104 and provide an always-on or on-demand video feed pointed in a direction of the user's 102 gaze via the digital imaging device, and/or may provide a personal display via the projection device integrated into the smart glasses 116 for displaying to its user information such as text, images, or video received from the portable radio 104 or directly from the infrastructure RAN 152. In some embodiments, an additional user interface mechanism such as a touch interface or gesture detection mechanism may be provided at the smart glasses 116 that allows the user 102 to interact with the display elements displayed on the smart glasses 116 or projected into the user's 102 eyes, or to modify operation of the digital imaging device, while in other embodiments, a display and input interface at the portable radio 104 may be provided for interacting with smart glasses 116 content and modifying operation of the digital imaging device, among other possibilities.

The smart glasses 116 may provide a virtual reality interface in which a computer-simulated reality electronically replicates an environment with which the user 102 may interact, may provide an augmented reality interface in which a direct or indirect view of real-world environments in which the user is currently disposed are augmented, i.e., supplemented, by additional computer-generated sensory input such as sound, video, images, graphics, GPS data, or other information, or may provide a mixed reality interface in which electronically generated objects are inserted in a direct or indirect view of real-world environments in a manner such that they may co-exist and interact in real time with the real-world environment and real world objects.

The sensor-enabled holster 118 may be an active (powered) or passive (non-powered) sensor that maintains and/or provides state information regarding a weapon or other item normally disposed within the user's 102 sensor-enabled holster 118. The sensor-enabled holster 118 may detect a change in state (presence to absence) and/or an action (removal) relative to the weapon normally disposed within the sensor-enabled holster 118. The detected change in state and/or action may be reported to the portable radio 104 via its short-range transceiver. In some embodiments, the sensor-enabled holster 118 may also detect whether the first responder's hand is resting on the weapon even if it has not yet been removed from the holster and provide such information to portable radio 104. Other possibilities exist as well.

The biometric sensor wristband 120 may be an electronic device for tracking an activity of the user 102 or a health status of the user 102, and may include one or more movement sensors (such as an accelerometer, magnetometer, and/or gyroscope) that may periodically or intermittently provide to the portable radio 104 indications of orientation, direction, steps, acceleration, and/or speed, and indications of health such as one or more of a captured heart rate, a captured breathing rate, and a captured body temperature of the user 102, perhaps accompanying other information. In some embodiments, the biometric sensor wristband 120 may include its own long-range transceiver and may communicate with other communication devices and/or with the infrastructure RAN 152 or vehicular transceiver 136 directly without passing through portable radio 104.

An accelerometer is a device that measures acceleration. Single and multi-axis models are available to detect magnitude and direction of the acceleration as a vector quantity, and can be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and can be used to determine a direction in which a person or device is facing.

The heart rate sensor may use electrical contacts with the skin to monitor an electrocardiography (EKG) signal of its wearer, or may use infrared light and imaging device to optically detect a pulse rate of its wearer, among other possibilities.

A breathing rate sensor may be integrated within the sensor wristband 120 itself, or disposed separately and communicate with the sensor wristband 120 via a short range wireless or wired connection. The breathing rate sensor may include use of differential capacitive circuits or capacitive transducers to measure chest displacement and thus breathing rates. In other embodiments, a breathing sensor may monitor a periodicity of mouth and/or nose-exhaled air (e.g., using a humidity sensor, temperature sensor, capnometer or spirometer) to detect a respiration rate. Other possibilities exist as well.

A body temperature sensor may include an electronic digital or analog sensor that measures a skin temperature using, for example, a negative temperature coefficient (NTC) thermistor or a resistive temperature detector (RTD), may include an infrared thermal scanner module, and/or may include an ingestible temperature sensor that transmits an internally measured body temperature via a short range wireless connection, among other possibilities.

Although the biometric sensor wristband 120 is shown in FIG. 1 as a bracelet worn around the wrist, in other examples, the biometric sensor wristband 120 may additionally and/or alternatively be worn around another part of the body, or may take a different physical form including an earring, a finger ring, a necklace, a glove, a belt, or some other type of wearable, ingestible, or insertable form factor.

The portable radio 104, RSM video capture device 106, laptop 114, smart glasses 116, sensor-enabled holster 118, and/or biometric sensor wristband 120 may form a personal area network (PAN) via corresponding short-range PAN transceivers, which may be based on a Bluetooth, Zigbee, or other short-range wireless protocol having a transmission range on the order of meters, tens of meters, or hundreds of meters.

The portable radio 104 and/or RSM video capture device 106 (or any other device in FIG. 1 for that matter) may each include a location determination device integrated with or separately disposed but communicably coupled to the portable radio 104 and/or RSM 106 and/or in respective receivers, transmitters, or transceivers of the portable radio 104 and RSM 106 for determining a location of the portable radio 104 and RSM 106. The location determination device may be, for example, a global positioning system (GPS) receiver or wireless triangulation logic using a wireless receiver or transceiver and a plurality of wireless signals received at the wireless receiver or transceiver from different locations, among other possibilities. The location determination device may also include an orientation sensor for determining an orientation that the device is facing. Each orientation sensor may include a gyroscope and/or a magnetometer. Other types of orientation sensors could be used as well. The location (and/or orientation) can then be stored locally and/or transmitted via the transmitter or transceiver to other computing devices and/or to the infrastructure RAN 152.

The vehicle 132 may include the vehicular computing device 133, the vehicular video camera 134 and/or microphone 135, the vehicular transceiver 136, and the head and/or eye-tracking device 139, all of which may be coupled to one another via a wired and/or wireless vehicle area network (VAN), perhaps along with other sensors physically or communicatively coupled to the vehicle 132. The vehicular transceiver 136 may include a long-range transceiver for directly wirelessly communicating with mobile computing devices such as the portable radio 104, the RSM 106, and the laptop 114 via wireless link(s) 142 and/or for wirelessly communicating with the infrastructure RAN 152 via wireless link(s) 144. The vehicular transceiver 136 may further include a short-range wireless transceiver or wired transceiver for communicably coupling between the vehicular computing device 133 and/or the vehicular video camera 134 in the VAN. The vehicular computing device 133 may, in some embodiments, include the vehicular transceiver 136 and/or the vehicular video camera 134 integrated therewith, and may operate to store and/or process video and/or audio produced by the video camera 134 and/or transmit the captured video and/or audio as a video and/or audio stream to the portable radio 104, other mobile computing devices, and/or the infrastructure RAN 152 for further analysis. The omni-directional or unidirectional microphone 135, or an array thereof, may be integrated in the video camera 134 and/or at the vehicular computing device 133 (or additionally or alternatively made available at a separate location of the vehicle 132) and communicably coupled to the vehicular computing device 133 and/or vehicular transceiver 136 for capturing audio and storing, processing, and/or transmitting the audio in a same or similar manner as set forth above with respect to the RSM 106.

The vehicle 132 may be a human-operable vehicle, or may be a self-driving vehicle operable under control of vehicular computing device 133 perhaps in cooperation with video camera 134 (which may include a visible-light camera, an infrared camera, a time-of-flight depth camera, and/or a light detection and ranging (LiDAR) device). Command information and/or status information such as location and speed may be exchanged with the self-driving vehicle via the VAN and/or the PAN (when the PAN is in range of the VAN or via the VAN's infrastructure RAN link).

The vehicle 132 and/or transceiver 136, similar to the portable radio 104 and/or respective receivers, transmitters, or transceivers thereof, may include a location (and/or orientation) determination device integrated with or separately disposed in the vehicular computing device 133 and/or transceiver 136 for determining (and storing and/or transmitting) a location (and/or orientation) of the vehicle 132.

In some embodiments, instead of a vehicle 132, a land, air, or water-based drone with same or similar audio and/or video and communications capabilities and same or similar self-navigating capabilities as set forth above may be disposed, and may similarly communicate with the user's 102 PAN and/or with the infrastructure RAN 152 to support the user 102 in the field.

The VAN may communicatively couple with the PAN disclosed above when the VAN and the PAN come within wireless transmission range of one another, perhaps after an authentication takes place there between, and one of the VAN and the PAN may provide infrastructure communications to the other, depending on the situation and the types of devices in the VAN and/or PAN and may provide interoperability and communication links between devices (such as video cameras) and sensors within the VAN and PAN.

Although the RSM 106, the laptop 114, the smart glasses 116, and the vehicle 132 are illustrated in FIG. 1 as providing example video cameras and/or microphones for use in capturing audio and/or video streams, other types of cameras and/or microphones could be used as well, including but not limited to, fixed or pivotable video cameras secured to lamp posts, automated teller machine (ATM) video cameras, other types of body worn cameras such as head-mounted cameras, other types of vehicular cameras such as roof-mounted cameras, or other types of audio and/or video recording devices accessible via a wired or wireless network interface same or similar to that disclosed herein.

Infrastructure RAN 152 is a radio access network that provides for radio communication links to be arranged within the network between a plurality of user terminals. Such user terminals may be mobile and may be known as 'mobile stations' or 'mobile devices,' and may include any one or more of the electronic computing devices illustrated in FIG. 1, among other possibilities. At least one other terminal, e.g. used in conjunction with mobile devices, may be a fixed terminal, e.g. a base station, eNodeB, repeater, and/or access point. Such a RAN typically includes a system infrastructure that generally includes a network of various fixed terminals, which are in direct radio communication with the mobile devices. Each of the fixed terminals operating in the RAN may have one or more transceivers which may, for example, serve mobile devices in a given region or area, known as a 'cell' or 'site', by radio frequency (RF) communication. The mobile devices that are in direct communication with a particular fixed terminal are said to be served by the fixed terminal. In one example, all radio communications to and from each mobile device within the RAN are made via respective serving fixed terminals. Sites of neighboring fixed terminals may be offset from one another and may provide corresponding non-overlapping or partially or fully overlapping RF coverage areas.

Infrastructure RAN 152 may operate according to an industry standard wireless access technology such as, for example, an LTE, LTE-Advance, or 5G technology over which an OMA-PoC, a VoIP, an LTE Direct or LTE Device to Device, or a PoIP application may be implemented.

Additionally or alternatively, infrastructure RAN 152 may implement a WLAN technology such as Wi-Fi perhaps operating in accordance with an IEEE 802.11 standard (e.g., 802.11a, 802.11b, 802.11g) or such as a WiMAX perhaps operating in accordance with an IEEE 802.16 standard.

Infrastructure RAN 152 may additionally or alternatively operate according to an industry standard LMR wireless access technology such as, for example, the P25 standard defined by the APCO, the TETRA standard defined by the ETSI, the dPMR standard also defined by the ETSI, or the DMR standard also defined by the ETSI. Because these systems generally provide lower throughput than the broadband systems, they are sometimes designated as narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) technique.

OMA-PoC, in particular and as one example of an infrastructure broadband wireless application, enables familiar PTT and "instant on" features of traditional half-duplex mobile devices, but uses mobile devices operating over modern broadband telecommunications networks. Using OMA-PoC, wireless mobile devices such as mobile telephones and notebook computers can function as PTT half-duplex mobile devices for transmitting and receiving. Other types of PTT models and multimedia call models (MMCMs) could be used as well.

Floor control in an OMA-PoC session is generally maintained by a PTT server that controls communications between two or more wireless mobile devices. When a user of one of the mobile devices keys a PTT button, a request for permission to speak in the OMA-PoC session is transmitted from the user's mobile device to the PTT server using, for example, a real-time transport protocol (RTP) message. If no other users are currently speaking in the PoC session, an acceptance message is transmitted back to the user's mobile device and the user can then speak into a microphone of the device. Using standard compression/decompression (codec) techniques, the user's voice is digitized and transmitted using discrete auditory data packets (e.g., together which form an auditory data stream over time), such as according to RTP and internet protocols (IP), to the PTT server. The PTT server then transmits the auditory data packets to other users of the PoC session (e.g., to other mobile devices in the group of mobile devices or talkgroup to which the user is subscribed), using for example, one or more of a unicast, point to multipoint, or broadcast communication technique.

Infrastructure narrowband LMR wireless systems, on the other hand, may operate in either a conventional or trunked configuration. In either configuration, a plurality of mobile devices is partitioned into separate groups of mobile devices.

In a conventional narrowband radio system, each mobile device in a group is selected to a particular radio channel (frequency or frequency & time slot) for communications associated with that mobile device's group. Thus, each group is served by one channel, and multiple groups may share the same single frequency (in which case, in some embodiments, group IDs may be present in the group data to distinguish between groups using the same shared frequency).

In contrast, a trunked narrowband radio system and its mobile devices use a pool of traffic channels for virtually an unlimited number of groups of mobile devices (e.g., talkgroups). Thus, all groups are served by all channels. The trunked radio system works to take advantage of the probability that not all groups need a traffic channel for communication at the same time. When a member of a group requests a call on a control or rest channel on which all of the mobile devices at a site idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the mobile devices were idling to a traffic channel for the call, and instruct all mobile devices that are not participating in the new call to move to a newly assigned control or rest channel selected from the pool of available channels. With a given number of channels, a much greater number of groups can be accommodated in a trunked radio system as compared with a conventional radio system.

Group calls may be made between wireless and/or wireline participants in accordance with either a narrowband or a broadband protocol or standard. Group members for group calls may be statically or dynamically defined. That is, in a first example, a user or administrator working on behalf of the user may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., mobile devices) could be provisioned in the network by the user or an agent, and then provided some form of group identity or identifier, for example. Then, at a future time, an originating user in a group may cause some signaling to be transmitted indicating that he or she wishes to establish a communication session (e.g., group call) with each of the pre-designated participants in the defined group. In another example, mobile devices may dynamically affiliate with a group (and also disassociate with the group) perhaps based on user input, and the switching and/or radio network may track group membership and route new group calls according to the current group membership.

In some instances, broadband and narrowband systems may be interfaced via a middleware system that translates between a narrowband PTT standard protocol (such as P25) and a broadband PTT standard protocol (such as OMA-PoC). Such intermediate middle-ware may include a middleware server for performing the translations and may be disposed in the cloud, disposed in a dedicated on-premises location for a client wishing to use both technologies, or disposed at a public carrier supporting one or both technologies. For example, and with respect to FIG. 1, such a middleware server may be disposed in infrastructure RAN 152 at controller 156 or at a separate cloud computing cluster 162 communicably coupled to controller 156 via internet protocol (IP) network 160, among other possibilities.

The infrastructure RAN 152 is illustrated in FIG. 1 as providing coverage for the portable radio 104, RSM video capture device 106, laptop 114, smart glasses 116, and/or vehicle transceiver 136 via a single fixed terminal 154 coupled to a single controller 156 (e.g., radio controller, call controller, PTT server, zone controller, MME, BSC, MSC, site controller, Push-to-Talk controller, or other network device) and including a dispatch console 158 operated by a dispatcher. In other embodiments, additional fixed terminals and additional controllers may be disposed to support a larger geographic footprint and/or a larger number of mobile devices.

The controller 156 illustrated in FIG. 1, or some other backend electronic computing device existing on-premises or in the remote cloud compute cluster 162 accessible via the IP network 160 (such as the Internet), may additionally or alternatively operate as a back-end electronic digital assistant, a back-end audio and/or video processing electronic computing device, and/or a remote cloud-based storage device consistent with the remainder of this disclosure.

The IP network 160 may comprise one or more routers, switches, LANs, WLANs, WANs, access points, or other network infrastructure, including but not limited to, the public Internet. The cloud compute cluster 162 may be comprised of a plurality of computing devices, such as the one set forth in FIG. 3, one or more of which may be executing none, all, or a portion of an electronic digital assistant service, sequentially or in parallel, across the plurality of computing devices. The plurality of computing devices comprising the cloud compute cluster 162 may be geographically co-located or may be separated by inches, meters, or miles, and inter-connected via electronic and/or optical interconnects. Although not shown in FIG. 1, one or more proxy servers or load-balancing servers may control which one or more computing devices perform any part or all of the electronic digital assistant function.

System 100 may additionally include a physical street sign 170, such as an intersection sign, that includes alphanumeric text and/or images that may identify, for example, two cross streets meeting one another at or near the location of the street sign 170. In other embodiments, various different types of signs, including physical or dynamically updateable electronic signs indicating construction updates, detours, events, traffic updates, advertisements, logos, building addresses, or other information may be implemented as well. The license plate 172 may be a physical or electronic display attached to the vehicle 132 that includes a unique identifier to uniquely identify (e.g., within a local region or area, county, city, state, or country) the vehicle 132 and may be linked to other information such as an owner, driver, employee, licensee, company, insurance information, traffic infraction information, make and/or model of the vehicle, or other information associated with the vehicle. The street sign 170 and the license plate 172 are merely example alphanumeric elements on graphical objects that will be described in more detail below with respect to the process 400 of FIG. 4.

Finally, although FIG. 1 describes a communication system 100 generally as a public safety communication system including a user 102 generally described as a police officer and vehicle 132 generally described as a police cruiser, in other embodiments, the communications system 100 may additionally or alternatively be a retail communications system including a user 102 that may be an employee of a retailer and a vehicle 132 that may be a vehicle for use by the user 102 in furtherance of the employee's retail duties (e.g., a shuttle or self-balancing scooter). In other embodiments, the communications system 100 may additionally or alternatively be a warehouse communications system including a user 102 that may be an employee of a warehouse and a vehicle 132 that may be a vehicle for use by the user 102 in furtherance of the employee's retail duties (e.g., a forklift).

In still further embodiments, the communications system 100 may additionally or alternatively be a private security communications system including a user 102 that may be an employee of a private security company and a vehicle 132 that may be a vehicle for use by the user 102 in furtherance of the private security employee's duties (e.g., a private security vehicle or motorcycle). In even further embodiments, the communications system 100 may additionally or alternatively be a medical communications system including a user 102 that may be a doctor or nurse of a hospital and a vehicle 132 that may be a vehicle for use by the user 102 in furtherance of the doctor or nurse's duties (e.g., a medical gurney or ambulance). In a last example embodiment, the communications system 100 may additionally or alternatively be a heavy machinery communications system including a user 102 that may be a miner, driller, or extractor at a mine, oil field, or precious metal or gem field and a vehicle 132 that may be a vehicle for use by the user 102 in furtherance of the miner, driller, or extractor's duties (e.g., an excavator, bulldozer, crane, or front loader). Other possibilities exist as well.

b. Device Structure

Figure 3:
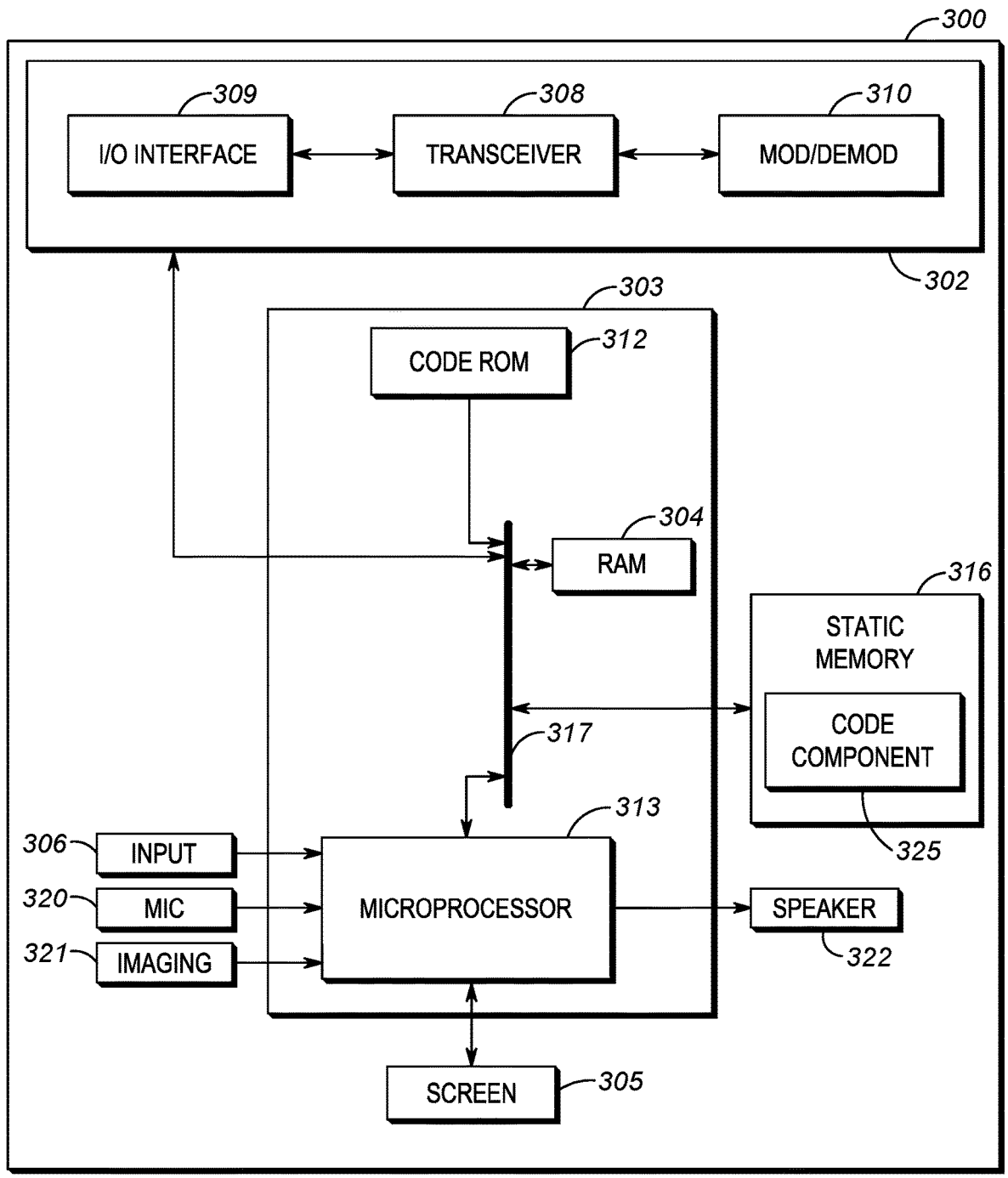
FIG. 3 is a device diagram showing a device structure of an electronic computing device for operating an electronic digital assistant, in accordance with some embodiments.

FIG. 3 sets forth a schematic diagram that illustrates a communication device 200 according to some embodiments of the present disclosure. The communication device 200 may be, for example, embodied in the portable radio 104, the RSM video capture device 106, the laptop 114, the mobile communication device 133, the infrastructure controller 156, the dispatch console 158, one or more computing devices in the cloud computing cluster 162, or some other communication device not illustrated in FIG. 1, and/or may be a distributed communication device across two or more of the foregoing (or multiple of a same type of one of the foregoing) and linked via a wired and/or wireless communication link(s). In some embodiments, the communication device 200 (for example, the portable radio 104) may be communicatively coupled to other devices such as the sensor-enabled holster 118 as described above. In such embodiments, the combination of the portable radio 104 and the sensor-enabled holster 118 may be considered a single communication device 200.

While FIG. 3 may represent the communication devices 200A-200C described above with respect to FIGS. 1 and 2, depending on the type of the communication device, the communication device 200 may include fewer or additional components in configurations different from that illustrated in FIG. 3. For example, in some embodiments, the communication device 200 acting as the infrastructure controller 156 of FIG. 1 may not include one or more of the screen 305, microphone 320, imaging device 321, and speaker 322. As another example, in some embodiments, the communication device 200 acting as the portable radio 104 of the RSM video capture device 106 of FIG. 1 may further include a location determination device (for example, a global positioning system (GPS) receiver) as explained above. Other combinations are possible as well.

As shown in FIG. 3, the communication device 300 includes a communications unit 302 coupled to a common data and address bus 317 of a processing unit 303. The communication device 300 may also include one or more input devices (for example, keypad, pointing device, touch-sensitive surface, button, a microphone 320, an imaging device 321, and/or another input device 306) and an electronic display screen 305 (which, in some embodiments, may be a touch screen and thus also acts as an input device), each coupled to be in communication with the processing unit 303.

The microphone 320 may be present for capturing audio from a user and/or other environmental or background audio that is further processed by processing unit 303 in accordance with the remainder of this disclosure and/or is transmitted as voice or audio stream data, or as acoustical environment indications, by communications unit 302 to other portable radios and/or other communication devices. The imaging device 321 may provide video (still or moving images) of an area in a field of view of the communication device 300 for further processing by the processing unit 303 and/or for further transmission by the communications unit 302. A speaker 322 may be present for reproducing audio that is decoded from voice or audio streams of calls received via the communications unit 302 from other portable radios, from digital audio stored at the communication device 300, from other ad-hoc or direct mode devices, and/or from an infrastructure RAN device, or may playback alert tones or other types of pre-recorded audio.

The processing unit 303 may include a code Read Only Memory (ROM) 312 coupled to the common data and address bus 317 for storing data for initializing system components. The processing unit 303 may further include an electronic processor 313 (for example, a microprocessor or another electronic device) coupled, by the common data and address bus 317, to a Random Access Memory (RAM) 204 and a static memory 316.

The communications unit 302 may include one or more wired and/or wireless input/output (I/O) interfaces 309 that are configurable to communicate with other communication devices, such as the portable radio 104, the laptop 114, the wireless RAN 152, and/or the mobile communication device 133.

For example, the communications unit 302 may include one or more wireless transceivers 308, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network.

The communications unit 302 may additionally or alternatively include one or more wireline transceivers 308, such as an Ethernet transceiver, a USB transceiver, or similar transceiver configurable to communicate via a twisted pair wire, a coaxial cable, a fiber-optic link, or a similar physical connection to a wireline network. The transceiver 308 is also coupled to a combined modulator/demodulator 310.

The electronic processor 313 has ports for coupling to the display screen 305, the microphone 320, the imaging device 321, the other input device 306, and/or the speaker 322. Static memory 316 may store operating code 325 for the electronic processor 313 that, when executed, performs one or more of the steps set forth in FIG. 4 and the accompanying text. The static memory 316 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like.

2. Processes for Tailoring an Electronic Digital Assistant Query as a Function of a Captured Multi-party Voice Dialog and an Electronically Stored Multi-party Voice-Interaction Template In some embodiments, an individual component and/or a combination of individual components of the system 100 may be referred to as an electronic computing device that implements an electronic digital assistant as mentioned above. For example, the electronic computing device may be a single electronic processor (for example, the electronic processor 313 of the portable radio 104). In other embodiments, the electronic computing device includes multiple electronic processors distributed remotely from each other. For example, the electronic computing device may be implemented on a combination of at least two of the electronic processor 313 of the portable radio 104, the electronic processor 213 of the infrastructure controller 156, and the electronic processor 313 of a back-end device in the cloud computing cluster 162 accessible via the IP network 160.

To use the electronic digital assistant implemented by the electronic computing device, the user 102 (and/or other user 182, users of devices 200A-C, etc.) may, for example, provide an audio dialog and/or an audio inquiry that is received by the microphone 320 of the communication device 300. In accordance with some embodiments, the audio dialog and/or inquiry received at the microphone is further transmitted as audio communications on a talk group channel for receipt by other users in a talk group. The electronic computing device receives signals representative of the audio dialog and/or inquiry (directly from the microphone 320 or through monitoring audio communications on the talk group channel) and analyzes the signals to determine the intent and/or content of the audio inquiry. For example, the electronic computing device may include a natural language processing (NLP) engine configured to determine the intent and/or content of the audio inquiry. The electronic computing device may also be configured to determine a response to the audio inquiry (for example, by retrieving stored data or by requesting data from a database such as the cloud computer cluster 162) and provide the response to an output device of the communication device 300 (for example, one or more of the speaker 322 via a generated audio response and the screen 305 via a generated text, graphic, and/or video-based response). In other words, one or more of the communication device 300, embodied in one or more of the communication devices of FIG. 1, such as the portable radio 104, the infrastructure controller 156, and/or cloud computing cluster 162 may include a natural language processing engine to analyze audio dialog and/or inquiries received from communication device(s) 300 and provide responses to the audio inquiries in the form of audio data, image data, text data, and/or functions to perform or actions to take.

Although an audio dialog and/or inquiry is described above, in some embodiments, the electronic computing device receives and responds to other types of dialog and queries. For example, the user 102 may submit a text dialog or inquiry to the electronic computing device by typing the text dialog or inquiry into a hard keyboard input device or a soft keyboard input provided on the screen 205 of the communication device 200. As another example, the user 102 may use the imaging device 221 to capture an image or video of an area and press a hard or soft key to send the image or video to the electronic computing device to, for example, allow the electronic computing device to identify an object in the image or video. This non-audio content may, for example, also be processed and used in responding to or supplementing future dialog and/or queries.

In accordance with some embodiments, the electronic digital assistant is also added to a talk group (for example, talk group 250) as a talk group member to monitor dialog and communications (as well as transmit communications) between communication devices 200A-200C that are members of the communications group. When the electronic computing device implementing the electronic digital assistant detects an audio inquiry or audio dialog, for example, a voice inquiry transmitted on a talk group channel by a particular talk group member, the electronic computing device implementing the electronic digital assistant processes the audio inquiry and responds to the audio inquiry in accordance with a process 400 illustrated in FIG. 4. The dialog or inquiry may be a specific inquiry transmitted on the talk group channel with the intent that the electronic digital assistant would hear the inquiry and respond (e.g., a spoken instruction to the electronic digital assistant to perform a particular function or retrieve particular information), or may dialog or a statement made from a first user to one or more other users (and/or responses thereto) where the electronic digital assistant determines it can extract a useful inquiry from the dialog or statement(s) and proactively provide additional information, context, or background to the communication group and/or individual or sub-group of users in the communication group in accordance with this disclosure.

Figure 4:
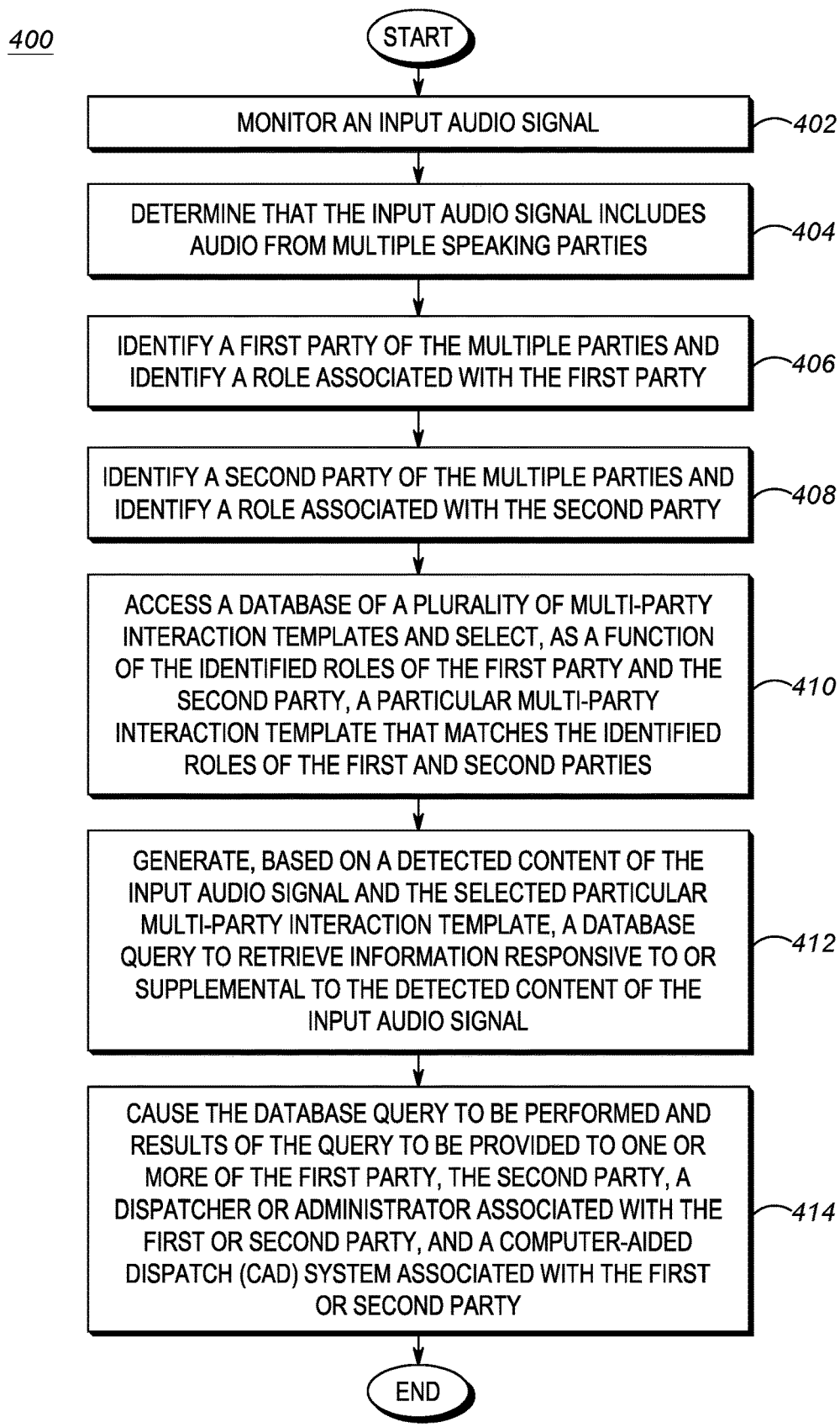
FIG. 4 illustrates a flowchart setting forth process steps for operating the electronic digital assistant of FIGS. 1 and/or 3, in accordance with some embodiments.

FIG. 4 illustrates a flow chart diagram of the process 400 performed by the electronic computing device for tailoring an electronic digital assistant query as a function of a captured multi-party voice dialog and an electronically stored multi-party voice-interaction template. While a particular order of processing steps, message receptions, and/or message transmissions is indicated in FIG. 4 as an example, timing and ordering of such steps, receptions, and transmissions may vary where appropriate without negating the purpose and advantages of the examples set forth in detail throughout the remainder of this disclosure.

Process 400 begins at step 402, where an electronic digital assistant operating at an electronic computing device monitors an input audio signal. The input audio signal may include a single audio stream representing audio of multiple parties captured via a single input audio transducer/microphone (for example, where the electronic digital assistant is implemented at an electronic computing device that is the same device that captured the audio, or where the electronic digital assistant is implemented at an electronic computing device that is a target of a private call in which the audio stream is captured and transmitted), may include a single audio stream representing an amalgamation of separate audio streams captured at separate input audio transducers/microphones and combined at, for example, a group PTT server before being provided to the electronic computing device (for example, where the electronic digital assistant is implemented at an electronic computing device that is added as a member to a talkgroup call), or may include multiple audio streams representing separate audio streams captured at separate input audio transducers/microphones (for example, where the electronic digital assistant is implemented at an electronic computing device that is the group PTT server). Other combinations of capture locations and device network locations are possible as well.

At step 404, the electronic digital assistant operating at the electronic computing device determines that the input audio signal includes audio from multiple speaking parties. The electronic digital assistant may determine that the input audio signal includes audio from multiple speaking parties in a number of ways.

Where the input audio signal includes a single audio stream representing audio of multiple parties captured via a single input audio transducer/microphone, various speech processing parameters may be used to identify and extract each speaker and their associated speech audio from the first audio content, such as distinguishing speakers based on one or more voice prosody characteristics (e.g., frequency/pitch of voice, rhythm, and/or loudness). Additionally or alternatively, identified differences in speaker gender, emotion, dialect, accent, and/or word complexity could be used to distinguish speakers. Still further, an identified content of the audio stream (perhaps identified after a voice to text conversion) that, for example, identifies question and answer pairs may be used to distinguish speakers. Where available, video captured at a same time as the audio may be used to identify lip movements (perhaps determined to correspond to the captured audio) and to distinguish speakers accordingly. In other embodiments, and where the capture device that produced the single audio stream includes a microphone array capable of identifying range and/or direction information relative to a source of audio, such range and/or direction information may be included in header information, embedded in a digital or analog audio signal of the audio stream, embedded between data frames making up a digital encoding of the input audio signal, or provided via a sideband mechanism (e.g., via some other communications channel) and may be used to distinguish speakers (e.g., a threshold distance in range and/or direction may be used to presume different speakers).

Where the input audio signal includes a single audio stream representing an amalgamation of separate audio streams captured at separate input audio transducers/microphones and combined at, for example, a group PTT server before being provided to the electronic computing device, any of above noted mechanisms set forth relative to the single audio stream from a single transducer/microphone source may be similarly use in this instance. Additionally or alternatively, the group PTT server may embed speaker information in a header, in a digital or analog audio signal of the audio stream, between data frames making up a digital encoding of the input audio signal, or via a sideband mechanism (e.g., via some other communications channel), that identifies a speaker or indicates a change in speaker, and the electronic digital assistant operating at the electronic computing device may use this information to distinguish speakers.

Where the input audio signal includes multiple audio streams representing separate audio streams captured at separate input audio transducers/microphones, any of the above-noted mechanisms set forth relative to the single audio stream from a single transducer/microphone source may be similarly used in this instance. Additionally or alternatively, the electronic digital assistant operating at the electronic computing device may use information included in headers or embedded in the multiple audio streams consistent with the foregoing description for identifying and distinguishing speakers, such as information identifying a source device, a talker identifier, a session identifier, a user identifier, an IP address, or some other identifier, to distinguish speakers. Other possibilities exist as well.

Process 400 then proceeds to step 406, where the electronic digital assistant operating at the electronic computing device identifies a first party of the multiple parties and identifies a role associated with the first party. Identifying the first party may include randomly selecting one of the multiple speaking parties identified at step 404, or may include selecting a first sequential one of the multiple speaking parties identified at step 404 as a first party, among other possibilities.

In some examples, an absolute identity of the first party may be possible, where the electronic digital assistant is able to uniquely identify the source of the speaker in the input audio signal either directly or indirectly via header information included in a header of the input audio signal or via embedded information embedded within the input audio signal itself consistent with the foregoing description, among other possibilities. In embodiments in which the speaker is directly identified via one of the mechanisms set forth above, no further identification steps may be required at step 406 beyond extracting the speaker information from the input audio stream.

In embodiments in which the speaker is indirectly identified, information extracted from the input audio signal may be used to subsequently obtain an absolute identity of the speaker. For example, an IP address extracted from the input audio signal identifying a source device that captured the audio may be cross-referenced against a user information database to identify an owner of the device and correspondingly identify the owner as the speaker. In other examples, audio snippets of the speaker may be provided to and cross-referenced against a database of voiceprints linked to absolute user identification information and, finding a voiceprint match, may be used to identify the speaker via the matching information. Other possibilities exist as well.

In other examples, an absolute identity of the first party (whether determined directly or indirectly) may not be possible, such as where the electronic digital assistant is unable to (and/or is not required to or is not programmed to) uniquely identify the source of the speaker in the input audio.

In such embodiments, the electronic digital assistant may assign a random and/or arbitrary identifier (e.g., a random, pseudo-random, or sequential alphanumeric identifier newly generated for each new speaker, or a random, pseudo-random, or sequential selection from a pool of available identifiers) to each separate one of the multiple speaking parties identified in step 404. Based on the method of identifying the multiple speaking parties at step 404, the electronic digital assistant may attempt to match recurring speakers and use the same random and/or arbitrary identifier for the recurring portions of the speech determined to be from a same relatively identified speaker.

Once the identity of the first party is identified, a role (e.g., a job function, task assignment, position, rank, or responsibility, generally or with respect to a particular incident, occurrence, commercial enterprise, location, time of day, and/or group of other party members) associated with the first party is identified at step 406. In some embodiments, the role associated with the first party may be provided in headers associated with the input audio signal or embedded in the input audio signal itself in a same or similar manner to that set forth above with respect to identifying the first party, and role information correspondingly extracted may be used to identify the role associated with the first party. For example, a device associated with a particular first party and stored with role information associated with the particular first party may embed such information in any captured audio, which may then be provided to and extracted by the electronic digital assistant at step 406.

In embodiments in which role information is not directly provided as above, but where the first party is capable of being absolutely identified at step 406, identifying the role associated with the first party may include accessing a party identifier to role database, perhaps stored in an agency database on-premises at an agency location or at an agency database stored in a cloud computer cluster, and identify the role of the first party using the identity of the first party identifier (e.g., name, user ID, etc.) and the user to role database. The role of the first party may then be stored locally at the electronic computing device and used in subsequent steps of process 400.

If role information is not directly provided as above and where the first party is not capable of being absolutely identified as above, role information may still be otherwise determined from a captured content of the input audio signal. For example, keywords extracted from the input audio signal may be matched against a database of keywords indicative of the first party having a particular role such as a patrol officer (e.g., "arrest," "perpetrator", "suspect", "dispatch", "jurisdiction", etc.) or a fireman (e.g., "fire," "flashpoint," "ladder truck," "hose," "oxygen tank," etc.). Similar keyword mechanisms could be used to identify suspects, witnesses, other types of first responders, other types of government and enterprise security roles, and still other types of more general roles. And still other keyword mechanisms could be used to identify roles such as housekeeping, maintenance, front desk, and other roles in a hospitality industry, or to identify roles such as driver, dispatcher, loader and other roles in a transportation industry. In addition to or in place of keyword-based mechanisms, natural language processing mechanisms may be applied to process the input audio signal and determine an intent behind a content of the input audio signal and map the determined intent to a corresponding role.

As another example, and where available, video analytics may be used on a received video provided contemporaneously with the input audio signal to identify a role associated with the first party. For example, lip-reading analytics or directional microphones could be used to determine which party in a video is speaking, and match the speech with time and/or location information associated with the input audio signal, to identify and match the first party in the input audio signal with the first party in the received video. Additional video analytics could then be used on the appearance and actions of the first party in the input audio signal to identify a role associated with the first party. As one example, a particular uniform or insignia worn by the first party and associated with a particular role may be detected via video analytics and used to identify a role of the first party (such as patrol officer, fireman, retail associated, retail manager, etc.). Other visual role-identification mechanisms could be used as well.

Behavior and/or actions detected of one party or interactions between two parties in the received video may also be used to assign role(s) as well. For example, video capturing a first user placing a second user in restraints such as handcuffs may be used to assign an officer role to the party detected to be placing the restraints and a suspect role to the other party receiving the restraints, or a uniformed retail associate detected to be interacting with a non-uniformed or differently uniformed customer, store manager, warehouse, or delivery employee may be used to assign corresponding roles. A determined location of the camera capturing the received video or of the first and/or second parties may additionally be used, perhaps in combination with the received video, to identify roles of the first and/or second parties. For example, if the camera and/or parties are determined to be located at a same location as a hotel, roles associated with a hotel may be given higher priority or are more likely to be assigned relative to roles associated with locations of retail stores or other locations.

Additionally or alternatively, stored workflow information may be used to assign role(s) as well. For example, types of incident assigned to a responder and stored in a CAD database perhaps at dispatch console 158 or cloud computer cluster 162 may be accessed and analyzed to determine an assigned role. Similarly, shift logs, assigned equipment, jurisdictional information, in-incident status information and/or updates, and other stored workflow information stored in same or similar electronic databases may be accessed and analyzed to determine an assigned role.

Process 400 then proceeds to step 408, where the electronic digital assistant operating at the electronic computing device identifies a second party of the multiple parties and identifies a role associated with the second party. Identifying the second party may include randomly selecting one of the multiple speaking parties identified at step 404 (but not already identified at step 406), or may include selecting a second sequential one of the multiple speaking parties identified at step 404 as a second party, among other possibilities.

The second party may be identified in much the same way as the first party set forth above with respect to step 406, and that description is not repeated here, with the exception that the second party identified at step 408 must be a different party than that identified at step 406 (e.g., distinguished via absolute identity as set forth above or via voice parameter as set forth in step 404, or otherwise), but may have a same or different or overlapping role or roles as the first party. Furthermore, the role of the first party identified at step 406 may aid in identifying the role associated with the second party (e.g., once the role or roles of the first party are determined, a database of related roles may be used to narrow the likely role or roles of the second party as a function of the role of the first party). Detected behaviors and/or actions between the first party and the second party may similarly aid in identifying the role associated with the second party. Referring again to the example of an arresting officer, video of a first party already identified as an officer (via uniform or insignia) may limit the available roles to assign to the second party to roles relating to officers (e.g., roles of parties that are likely to interact with officers, such as witnesses, suspects, other officers, or commanders). And detected interactions indicative of relationships between the first party and the second party may be useful in identifying or limiting, for selection, a role or roles associated with the second party (e.g., the first party detected via video to be placing the second party in restraints and/or detected via the input audio signal to use the phrase "you are under arrest" may imply that the second party is likely in a suspect role).

Subsequent to steps 406 and 408, process 400 proceeds to step 410, where the electronic digital assistant operating at the electronic computing device accesses a database of a plurality of multi-party interaction templates and selects, as a function of the identified roles of the first party and the second party, a particular multi-party interaction template that matches the identified roles of the first and second parties. Of course, process 400 is not limited to two parties, and in some embodiments, additional parties and roles may be identified during process 400, and the database of multi-party interaction templates may include templates for three or more roles as well.

As one example, the database may include public safety profiles for role pairs including a first responder and witness role pair multi-party interaction template, a first responder and suspect role pair multi-party interaction template, and a first responder and other officer role pair multi-party interaction template. Some incident based multi-party interaction templates may include, for example, all of the foregoing roles in a single multi-party interaction template when all of these roles are present in the input audio signal.

Additionally or alternatively, the database may include enterprise or commercial profiles for role pairs including a retail associate and customer role pair multi-party interaction template, a retail associate and store manager role pair multi-party interaction template, a retail associate and warehouse role pair multi-party interaction template, and a retail associate and delivery role pair multi-party interaction template. Other examples are possible as well.

The multi-party interaction templates may include any of several various types of information for classifying, refining, and/or extracting communications between identified parties and their corresponding roles from the input audio signal. As one example, each multi-party interaction template may include keywords or intents associated with each identified role in a relationship represented by the multi-party interaction template. Each keyword or intent may be associated with extracting relatively higher priority or relatively more useful information for that keyword/role/relationship/interaction compared to other information included in the input audio signal. Keywords and intents, and surrounding contextual terms from the input audio signal, may be used for identifying key information for use in the generating of a database query in subsequent steps.

Additionally or alternatively, each multi-party interaction template may include an indication of a trustworthiness of information emanating from each party (based on role) identified in the multi-party interaction template. Information identified as having high trustworthiness (e.g., perhaps associated with parties having an officer, teacher, or manager role) may be treated as true for the purposes of subsequent steps, and may not be separately verified. On the other hand, information identified as having low trustworthiness (e.g., perhaps associated with parties having a suspect, student, or customer role) may be treated as having suspect trustworthiness and may be subsequently and automatically validated in subsequent steps prior to being relied upon (if ever relied upon).

Additionally or alternatively, each multi-party interaction template may include an indication of which party (based on role) a database query result generated in subsequent steps should be ultimately provided back to. For example, in an officer/suspect multi-party interaction template, information derived from automatically generated database queries may be targeted for delivery, as identified in the corresponding officer/suspect multi-party interaction template, back to the officer alone and not to the suspect. As another example, in a retail associate/customer multi-party interaction template, information derived from automatically generated database queries may be targeted for delivery, as identified in the corresponding retail associate/customer multi-party interaction template, back to both the retail associate and the customer. Other examples are possible as well, and other types of information could be included in the multi-party interaction templates.

Different multi-party interaction templates, while having some overlap between different combinations of roles, are likely to include different keywords, different levels of trustworthiness, and/or different delivery preferences between them, and thus be different from one another in at least some aspects.

Process 400 then proceeds to step 412, where the electronic digital assistant operating at the electronic computing device automatically (e.g., without manual user intervention) generates, based on a detected content of the input audio signal and the selected particular multi-party interaction template, a database query to retrieve information responsive to or supplemental to detected content of the input audio signal.

For example, the generated database query could be a public or enterprise safety query of a public of enterprise safety database (or legal, human resources, or any other type of database) for one of a name, physical attribute, address, birth date, vehicle ownership, property ownership, or past criminal activity associated with a person or entity mentioned in the input audio signal. As a further example, the generated database query could be a commercial query of one of a personal name, product name attribute, product location, service name or attribute, store address, sale date, sale price, sale discount, rebate amount, or task status associated with a person or entity mentioned in the input audio signal.

The particular query generated at step 412 and/or the particular database to which it is directed is determined as a function of content of the input audio signal (e.g., information included in the input audio signal in the form of a question or statement) and contents of the selected particular multi-party interaction template. For example, where the selected particular multi-party interaction template includes particular keywords or intents associated with the roles to which the selected particular multi-party interaction template relates, the generated database query and the database to which it is directed may be created as a function of the keyword, intent, surrounding context from the input audio signal, and/or role-specific parameters or characteristics stored in the selected particular multi-party interaction template.

As one example, where a keyword in a retail associate and customer multi-party interaction template includes a name of a product associated with a place of business with which the retail associated is employed, such as a "MotoTrbo Radio," the detection of the keyword in the input audio signal may cause a database query to be automatically generated to one of a number of product or location-based databases, and the particular query and/or target database may vary depending on the keyword itself, context or other terms surrounding the keyword and extracted from the input audio signal along with the keyword, and/or the identity/role of the party to speak the keyword.

As one further example, where an intent in a retail associate and customer multi-party interaction template includes an intent to determine a stock level of a particular product, the detection of the intent in the input audio signal may cause a database query to be automatically generated to one of a number of product or location-based databases for the named product, and the particular query and/or target database may vary depending on context or other terms surrounding the intent and extracted from the input audio signal along with the intent, and/or the identity/role of the party to speak the intent.

As one further example, the query generated at step 412 may be responsive to an explicit question voiced by the retail associate or customer and captured in the input audio signal. For example, the retail associate may ask, "What is the current stock level of the MotoTrbo Radio?" A corresponding query generated at step 412 may responsively request a current stock level via a product stock-level database using the keyword "MotoTrbo Radio" extracted from the input audio signal. Or the customer may ask, "What aisle can I find the MotoTrbo Radios?" A corresponding query generated at step 412 may thus request a current aisle location via a store location database using the keyword "MotoTrbo Radio" extracted from the input audio signal.

In other examples, the query generated may be supplemental to an explicit question or statement voiced by the retail associate or customer and captured in the input audio signal. For example, the customer may ask, "What are the current features of the MotoTrbo Radio?" A corresponding query generated at step 412 may request a current stock level via a product stock-level database using the keyword "MotoTrbo Radio" extracted from the input audio signal in order to provide the retail associate with stock level information to supplement the retail associate's answer to the customer's direct question regarding product features.

Independent of whether the query is generated in response to or as a supplement to a question or statement from one of the parties, and as set forth earlier, the query generated at step 412 may further depend on who (e.g., which one of the multiple parties included in the multi-party interaction template) is determined to have spoken a particular keyword included in the template or spoken a particular intent matching a stored intent included in the template.

For example, where "MotoTrbo Radio" is a stored keyword in the template and is determined to have been voiced by the retail associate, the database query generated at step 412 may be an inventory status query of an inventory database using the product name (and as configured via the retail associate and customer multi-party interaction template). If, on the other hand, the customer is determined to have spoken the "MotoTrbo Radio" keyword, the database query may instead be a product location query of a product location database using the product name (as configured via the retail associate and customer multi-party interaction template including the "MotoTrbo Radio" keyword). Similar variations can be applied to spoken intents as well.

Where the selected particular multi-party interaction template also includes particular roles having higher or lower trustworthiness factors, information detected from a party having a lower trustworthiness factor (as set forth in the multi-party interaction template) may automatically trigger a database query to confirm the accuracy of information captured and extracted from the input audio signal, while information detected from a party having a higher trustworthiness factor may be treated as likely accurate and may not automatically trigger a similar database query.

Using the example above of a retail setting in which a "MotoTrbo Radio" product is mentioned, if the input audio signal indicates the customer voicing a question about a price, stock level, or location of a "MotoFast Radio", at step 412 and using a corresponding retail associate/customer multi-party interaction template that includes assigned higher and lower trustworthiness factors respectively assigned to the retail associate and the customer, the query automatically generated at step 412 may be based on a low trustworthiness factor assigned to the customer and may be generated to confirm that there is actually a product called MotoFast Radio, and to locate other similarly spelled product names that the customer may be likely trying to refer to instead. Accordingly, the query generated at step 412 may be directed to a product name database using the query term "MotoFast Radio," and if it is determined that the customer is more likely referring to a MotoTrbo Radio, may also perform a subsequent query using the modified product name "MotoTrbo."

If, on the other hand, the input audio signal indicates the retail associate asking about a price, stock level, or location of a "MotoFast Radio", at step 412 and using the same corresponding retail associate/customer multi-party interaction template, no query may be generated at step 412, or in some embodiments, a query may be automatically generated at step 412 based on a high trustworthiness factor assigned to the retail associate and may be generated to confirm a corresponding price, stock level, or location of a product called MotoFast Radio (even though that product may be much less popular, at lower stock, or rarer than the MotoTrbo Radio). Accordingly, the query generated at step 412 may be directed to a different database (e.g., a product status database) using the same query term "MotoFast Radio."

Process 400 then proceeds to step 414, where the electronic digital assistant operating at the electronic computing device causes the database query to be performed (e.g., causes the query generated at step 412 to be provided to the proper corresponding database) and results of the query (received in response to the query provided to the proper corresponding database) to be provided to one or more of the first party, the second party, an administrator or dispatcher associated with the first or second party, and a computer-aided-dispatch (CAD) system associated with the first or second party (among potentially other targets as set forth in the multi-party interaction template).

By default, and if not otherwise specified, results of the query may be provided to all parties associated with the particular multi-party interaction template that are reachable (e.g., a network path is identified to reach each party). In other embodiments, results of the query may be provided to an administrator or dispatcher by default (such as a dispatcher associated with dispatch console 158 or an administrator providing an administrative or information dispersion function for the first or second parties or other parties associated with the first or second parties), who may optionally provide an additional filtering function and determine which query results to forward on to the one or more targets identified above. In still further embodiments, results of the query may be provided to a computer-aided-dispatch (CAD) system for storage or further distribution via a CAD operator.

In some instances, the particular multi-party interaction template may specify that query responses should be routed only to certain parties based on that party's role. For example, using the retail associate/customer examples set forth above, the retail associate/customer multi-party interaction template may specify that all query responses, whether generated by customer or retail associate portions of the input audio signal, should always be provided to the retail associate alone. As another example, where the multi-party interaction template is associated with one or more first responders and one or more non-first-responders, the multi-party interaction template may indicate that results of any query are to be provided to the one or more first-responders and not to the one or more non-first-responders. Other examples and combinations are possible as well In other instances, the particular multi-party interaction template may specify that queries generated due to a particular keyword or intent match may go to a particular identified subset of all parties (including a single party) associated with the particular multi-party interaction template (which may vary based on the keyword or intent and/or based on context surrounding the keyword or intent), may specify that queries generated due to an associated low (relative to a threshold, or lower relative to other trustworthiness factor(s) in the multi-party interaction template) trustworthiness factor may go to either the party associated with the low trustworthiness factor or to one or more other parties in the multi-party interaction template with relatively higher trustworthiness factors (including the party with a highest trustworthiness factor), or may specify other possibilities.

In one embodiment, and returning to the example set forth above, where the retail associate may ask, "What is the current stock level of the MotoTrbo Radio?," the retail associate/customer multi-party interaction template may specify that query responses for queries relating to product-related stock levels initiated by retail associates are provided back to only the party with the retail associate role and not to the party with the customer role as set forth in the multi-party interaction template.

As another example, where the customer asks "What aisle can I find the MotoTrbo Radios?," the retail associate and customer multi-party interaction template may specify that query responses for queries relating to product locations initiated by customers are provided back to only the party with the retail associate role and not to the party with the customer role as set forth in the multi-party interaction template, or may specify that query responses for queries relating to product locations initiated by customers are provided back to both the retail associate role party and to the customer role party as set forth in the multi-party interaction template.

As a still further example, where the input audio signal indicates a customer voicing a question about a price, stock level, or location of a "MotoFast Radio", and where the corresponding retail associate/customer multi-party interaction template that includes assigned higher and lower trustworthiness factors respectively assigned to the retail associate and the customer, the retail associate/customer multi-party interaction template itself may specify, or some separate mapping that sets forth threshold levels of trustworthiness to be identified as a target to be provided the query response at step 414, the query results may be provided to all parties or may only be provided to the retail associate party assigned the higher (or highest, or threshold level) trustworthiness factor.

Once the targets of the query results are identified, the electronic digital assistant operating at the electronic computing device causes the query results to be provided to the identified targets. For example, the electronic digital assistant may compose a text message response, an e-mail response, or an instant message response, and provide the query results to the identified targets by providing the composed text message response, e-mail response, or instant message response to a text message server, e-mail server, or instant message server accompanying identities of the identified targets (or a group identifier therefore) for further distribution of the results to the identified targets. The received text message, e-mail, or instant message could then be displayed or played back (e.g., via a text-to-voice feature) at each receiving target device according to each target device's configuration.

In still other embodiments, the electronic digital assistant operating at the electronic computing device may request one or more narrowband or broadband voice channels from a PTT controller, zone controller, or the like that connects with the identified targets, and may provide the query results to the identified targets via the one or more established voice channels (e.g., perhaps via a voice-to-text playback of generated query results provided over multiple private/unicast calls or over a single multicast/talkgroup call established with the identified targets, among other possibilities) using any one or more of the broadband and narrowband applications or protocols set forth earlier.

For example, if a talkgroup exists but is not active, the electronic digital assistant operating at the electronic computing device may request an active voice channel and the floor, and once granted, provide the generated query results. On the other hand, if a voice channel is already assigned to the talkgroup but the electronic digital assistant is not currently granted the floor (e.g., permission to talk), the electronic digital assistant may request the floor and, once granted, provide the generated query results. Other examples are possible as well.

In still other embodiments, the results of the database query at step 414 may produce media other than text, such as image, graphics, or video, which may be provided to the same one or more targets as already discussed above in a same or similar manner to that discussed above, but which may also be delivered by providing a uniform resource locator (URL) link that, once activated, allows the receiving device to retrieve the corresponding image, graphics, or video. In still further embodiments, the results of the database query at step 414 may be an instruction to perform a function, such as changing a radio to a particular channel or to a particular talkgroup, to increase or decrease a volume of the radio, to report a current location, or perform some other function.

3. Conclusion

In accordance with the foregoing, an improved device, method, and system is disclosed for an electronic digital assistant to computationally process captured multi-party voice dialog and generate a query and provide a response to, or supplemental information for, the captured multi-party voice dialog as a function of an electronically stored multi-party voice-interaction template.

As a result of the foregoing, and in some embodiments, electronic digital assistants may computationally consider and provide assistance within multiple party conversations digitally captured and processed by the electronic digital assistant, allowing electronic digital assistant to provide more substantive responses that consider additional context and inter-party and role-based information compared to traditional single-person inquiries and responses processed by conventional electronic digital assistants, and without requiring large memory spaces and processing power required to store every possible situation and response, and without requiring large datasets and time-consuming training periods required by deep-learning and other machine learning mechanisms. Other features and advantages are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for tailoring an electronic digital assistant generated query as a function of a captured multi-party voice dialog and an electronically stored multi-party voice-interaction template, the method comprising:
monitoring, at an electronic processing device, an input audio signal;
determining, by the electronic processing device, that the input audio signal includes audio from multiple speaking parties;
identifying, by the electronic processing device, a first party of the multiple parties and identifying a first role associated with the first party;
identifying, by the electronic processing device, a second party of the multiple parties and identifying a second role associated with the second party;
accessing, by the electronic processing device, a database of a plurality of multi-party interaction templates and selecting, as a function of the identified roles of the first party and the second party, a particular multi-party interaction template from the plurality of multi-party interaction templates that matches the identified roles of the first party and the second party;
generating, by the electronic processing device based on a detected content of the input audio signal and the selected particular multi-party interaction template, a database query to retrieve information responsive to or supplemental to the detected content of the input audio signal; and
causing, by the electronic processing device, the database query to be performed and causing, by the electronic processing device, results of the query to be provided to one or more of the first party, the second party, a dispatcher or administrator associated with the first or second parties, and a computer-aided-dispatch (CAD) system associated with the first or second parties
wherein identifying the first role of the first party comprises receiving an indication of the first role of the first party from a mobile communications device associated with the first party; and
wherein identifying the second role of the second party comprises determining a relationship between the first party and the second party, as a function of the identified first role of the first party and the detected content of the input audio signal, and identifying the second role of the second party as a function of the determined relationship.

2. The method of claim 1, wherein the mobile communication device associated with the first party also provides the input audio signal to the electronic processing device.

3. The method of claim 1, wherein the identified first role of the first party is a first responder role, and the identified second role of the second party is one of a witness, suspect, and other officer role.

4. The method of claim 3, wherein the plurality of multi-party interaction templates includes profiles for role pairs including a first responder and witness role pair multi-party interaction template, a first responder and suspect role pair multi-party interaction template, and a first responder and other officer role pair multi-party interaction template.

5. The method of claim 4, wherein each multi-party interaction template includes the keywords or intents associated with the relationship between the parties and their roles represented by the multi-party interaction template for identifying key information for use in the generating of the database query.

6. The method of claim 3, wherein the database query is one of a name, physical attribute, address, birth date, vehicle ownership, property ownership, or past criminal activity associated with a person or entity mentioned in the input audio signal.

7. The method of claim 1, wherein each multi-party interaction template includes an the indication of the trustworthiness of information emanating from each party identified in the multi-party interaction template.

8. The method of claim 7, wherein particular information received in the input audio signal and assigned, via a particular associated multi-party interaction template, a low indication of trustworthiness, causes an electronic digital assistant query to be automatically generated to an associated information database requesting confirmation of the particular information.

9. The method of claim 1, wherein each multi-party interaction template includes the indication of which party in the multi-party interaction template results of the query should be provided to.

10. The method of claim 9, wherein when the particular multi-party interaction template is associated with one or more first responders and one or more non-first-responders, the particular multi-party interaction template indicating that results of the query are to be provided to the one or more first-responders and not to the one or more non-first-responders.

11. The method of claim 1, wherein the results of the query are provided to one or both of the first and second parties via a text message, e-mail, or instant message.

12. The method of claim 1, wherein the results of the query are provided to one or both of the first and second parties via a text-to-voice response provided via a talkgroup call.

13. The method of claim 1, wherein the identified first role of the first party is a retail associate role, and the identified second role of the second party is one of a customer, store manager, warehouse, and delivery role.

14. The method of claim 13, wherein the plurality of multi-party interaction templates includes profiles for role pairs including a retail associate and customer role pair multi-party interaction template, a retail associate and store manager role pair multi-party interaction template, a retail associate and warehouse role pair multi-party interaction template, and a retail associate and delivery role pair multi-party interaction template.

15. The method of claim 1, wherein the database query is one of a product name, inventory status, product price, sale or discount, associate schedule, and task status associated with a person or entity mentioned in the input audio signal.

16. A method for tailoring an electronic digital assistant generated query as a function of a captured multi-party voice dialog and an electronically stored multi-party voice-interaction template, the method comprising:
monitoring, at an electronic processing device, an input audio signal;
determining, by the electronic processing device, that the input audio signal includes audio from multiple speaking parties;
identifying, by the electronic processing device, a first party of the multiple parties and identifying a first role associated with the first party;

identifying, by the electronic processing device, a second party of the multiple parties and identifying a second role associated with the second party;

accessing, by the electronic processing device, a database of a plurality of multi-party interaction templates and selecting, as a function of the identified roles of the first party and the second party, a particular multi-party interaction template from the plurality of multi-party interaction templates that matches the identified roles of the first party and the second party;

generating, by the electronic processing device based on a detected content of the input audio signal and the selected particular multi-party interaction template, a database query to retrieve information responsive to or supplemental to the detected content of the input audio signal; and causing, by the electronic processing device, the database query to be performed and causing, by the electronic processing device, results of the query to be provided to one or more of the first party, the second party, a dispatcher or administrator associated with the first or second parties, and a computer-aided-dispatch (CAD) system associated with the first or second parties wherein identifying the first role of the first party or the second role of the second party comprises applying video analytics to a captured video of the first party and the second party, determining, via the video analytics, a relationship between the first party and the second party, and identifying the first role of the first party or the second role of the second party as a function of the determined relationship.

17. The method of claim 16, further comprising receiving, at the electronic processing device, an indication of a location at which the first and the second parties are located, and further using the indicated location along with the video analytics to determine the relationship between the first party and the second party and to identify the first role of the first party or the second role of the second party as a function of the determined relationship.

18. An electronic processing device for tailoring an electronic digital assistant generated query as a function of a captured multi-party voice dialog and an electronically stored multi-party voice-interaction template, the device comprising:

a memory;

a transceiver; and one or more processors configured to:

monitor an input audio signal;

determine that the input audio signal includes audio from multiple speaking parties;

identify a first party of the multiple parties and identify a first role associated with the first party by receiving an indication of the first role of the first party from a mobile communications device associated with the first party;

identify a second party of the multiple parties and identifying a second role associated with the second party by determining a relationship between the first party and the second party, as a function of the identified first role of the first party and the detected content of the input audio signal, and identifying the second role of the second party as a function of the determined relationship;

access, via a local electronic storage or via the transceiver, a database of a plurality of multi-party interaction templates and select, as a function of the identified roles of the first party and the second party, a particular multi-party interaction template from the plurality of multi-party interaction templates that matches the identified roles of the first party and the second party;

generate, based on a detected content of the input audio signal and the selected particular multi-party interaction template, a database query to retrieve information responsive to or supplemental to the detected content of the input audio signal; and cause the database query to be performed and cause, via the transceiver, results of the query to be provided to one or more of the first party, the second party, a dispatcher or administrator associated with the first or second parties, and a computer-aided-dispatch (CAD) system associated with the first or second parties.

* * * * *